Aug. 9, 1966    T. R. STOCKTON ETAL    3,265,081
CENTRIFUGAL FLUID PRESSURE GOVERNOR ASSEMBLY
Filed May 8, 1963    2 Sheets-Sheet 1
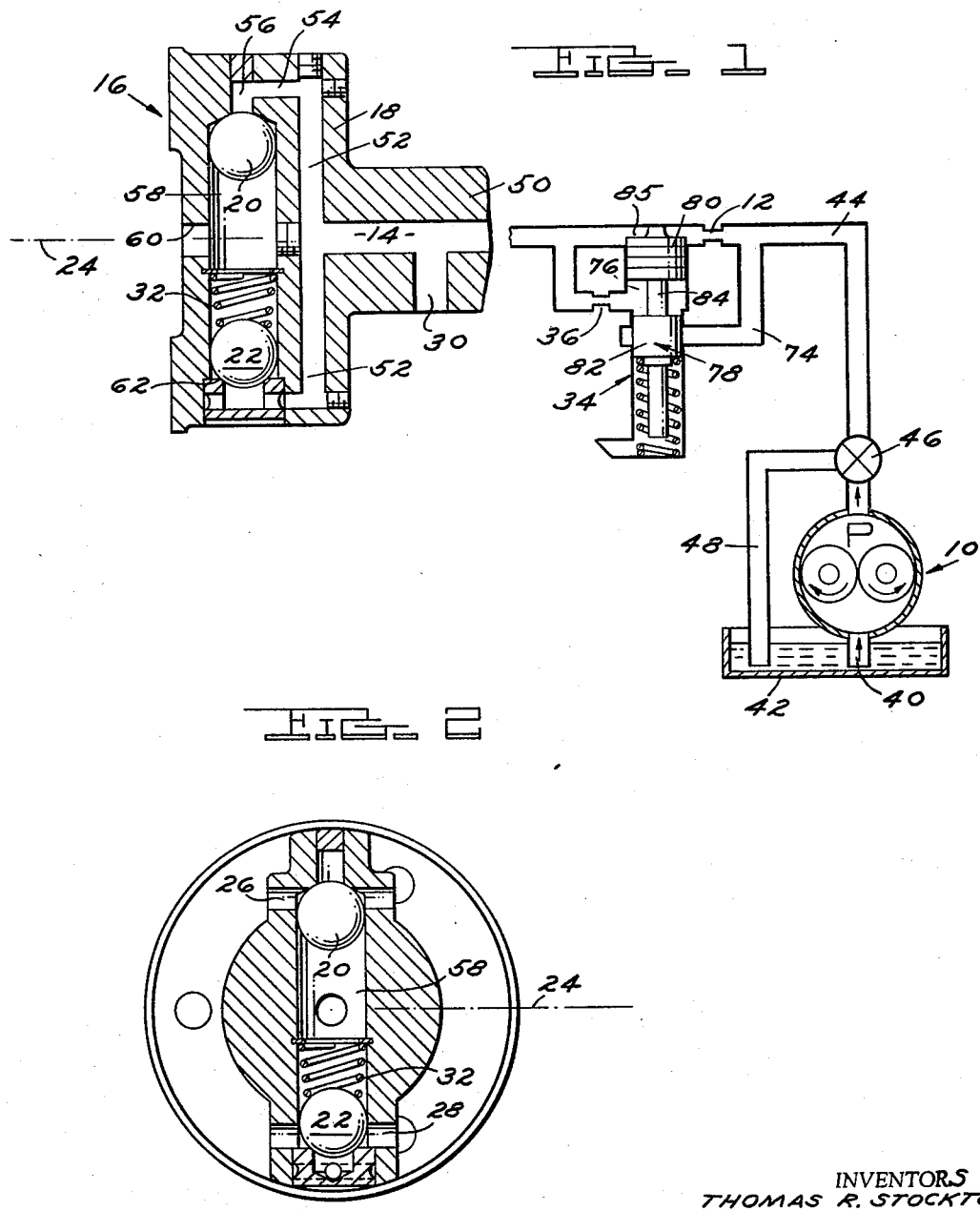
INVENTORS
THOMAS R. STOCKTON
REGINALD T. LEWICKI
BY
John R. Faulkner
Robert E. McCollum
ATTORNEYS Aug. 9, 1966   T. R. STOCKTON ETAL   3,265,081
CENTRIFUGAL FLUID PRESSURE GOVERNOR ASSEMBLY
Filed May 8, 1963   2 Sheets-Sheet 2
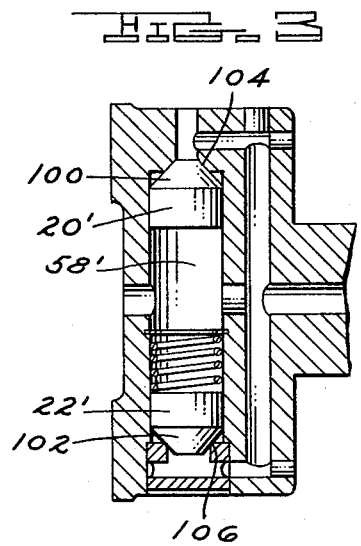
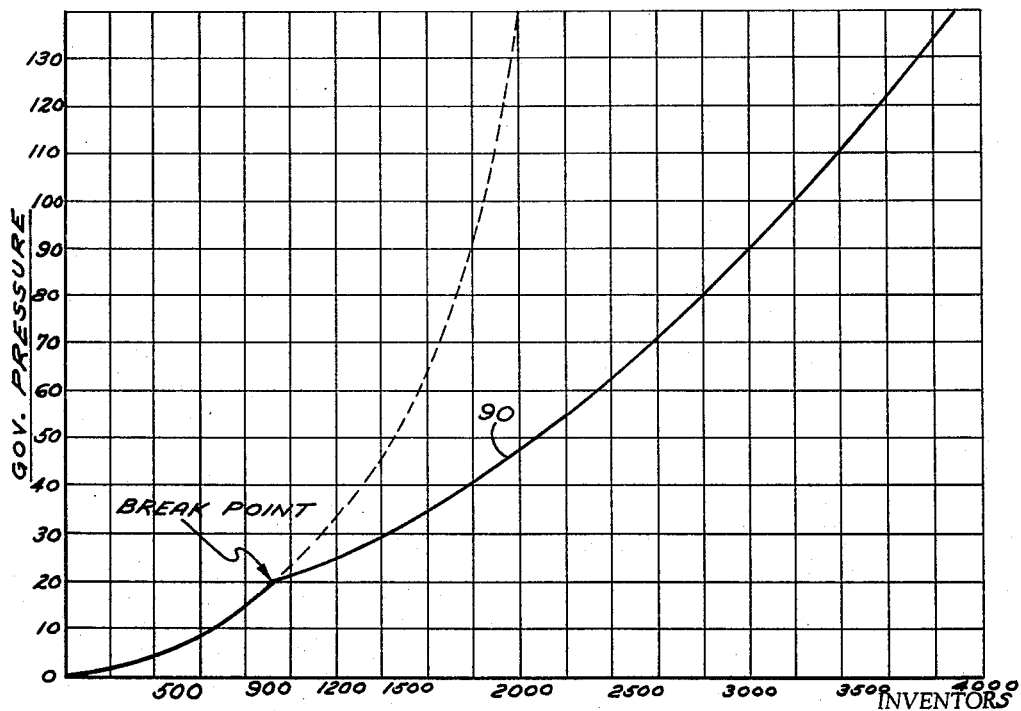
INVENTORS
THOMAS R. STOCKTON
REGINALD T. LEWICKI
BY
John R. Faulkner
Robert E. McCollum
ATTORNEYS United States Patent Office 3,265,081
Patented August 9, 1966

3,265,081
CENTRIFUGAL FLUID PRESSURE
GOVERNOR ASSEMBLY
Thomas R. Stockton, Northville, and Reginald T. Lewicki, Dearborn, Mich., assignors to Ford Motor Company, Dearborn, Mich., a corporation of Delaware
Filed May 8, 1963, Ser. No. 278,951
19 Claims. (Cl. 137—54)

This invention relates to a fluid pressure governor assembly. More particularly, it relates to one of the multi-stage, centrifugal types providing different rates of change of the rise in the output fluid pressure with changes in the speed of rotation of the governor body.

One of the objects of the invention is to construct a fluid pressure governor that is simple in construction, economical to manufacture, and has minimum fluid leakage, thereby providing efficient operation.

Another object of the invention is to provide a governor having independent speed responsive members providing a fast rate of change of the governor output fluid pressure at low speeds of operation, and a slow rate of pressure rise at higher speeds.

A further object of the invention is to provide a fluid pressure governor of the type described, wherein the governor components providing a slow rate of change of pressure rise are rendered inoperative to regulate the fluid pressure until the components providing a fast rate of change have terminated their fluid regulating operation.

It is also an object of the invention to construct a two-stage centrifugal fluid pressure governor with flow restricting means in the fluid supply line for maintaining a controlled flow to the governor regulating apparatus at low speeds of rotation of the governor, coupled with means responsive to the increase in the governor output pressure at higher governor speeds to vary the flow to the regulating means.

It is a still further object of the invention to provide a hydraulic governor having two centrifugally responsive fluid pressure regulating valves controlling the rate of flow across a flow restricting orifice in the governor fluid inlet line, one valve initially regulating the flow to provide a fast rate of change of the rise in pressure in the governor output line, the other valve at higher governor speeds and pressures acting in conjunction with a flow rate modifying means to provide a slower rate of change of the pressure rise.

Other objects, features, and advantages of the invention will become apparent upon reference to the succeeding detailed description thereof, and to the drawings illustrating the preferred embodiments thereof; wherein, FIGURE 1 is a cross-sectional schematic view of a governor assembly embodying the invention;

FIGURE 2 is a cross-sectional view of FIGURE 1 taken on a plane indicated by and viewed in the direction of the arrows 2—2 of FIGURE 1;

FIGURE 3 is a view similar to a portion of FIGURE 1 showing a modification; and, FIGURE 4 pictorially illustrates the different rates of change of the governor output fluid signal pressure with changes in the speed of rotation of the governor.

FIGURE 1 shows, in general, a pump 10 supplying fluid under pressure through a fixed area orifice 12 to the inlet line 14 of a centrifugal fluid pressure governor 16. The governor includes a rotating body 18 having two ball fluid pressure regulating or dump valves 20 and 22 located on opposite lateral sides of the axis 24 of rotation. The valves regulate the dumping or exhaust of fluid from inlet line 14 to outlet lines 26 and 28 to control the rate of flow across the orifice 12 as a function of the speed of rotation of body 18. This regulation causes a governor back pressure or output pressure signal in a branch line 30 varying as a function of the change in speed of rotation of the governor.

The ball valve 20 begins regulating as soon as rotation of the governor occurs to provide a fast rate of change of pressure in line 30. Ball valve 22, however, is held closed by a spring 32 so as to be inoperative to regulate until ball valve 20 has terminated its regulating operation. Valve 22 then provides a different governor output pressure curve, providing a slow rate of change of the pressure with changes in the speed of rotation of the governor. This latter regulation is obtained by increasing the rate of flow to the valve when it begins regulating. The increased flow is occasioned by the actuation of a valve 34 to open a second orifice 36 and thus flow fluid to the ball regulating valve 22 through both orifices simultaneously.

The introduction of a second orifice into the system is desirable due to the pressure of the orifice 12 and the higher flow requirements at higher speeds. That is, with the governor at rest, the ball valve member 20 by its own weight, has moved radially inwardly to the axis, and bores 26 are wide open. If the fluid pump 10 is driven by the engine instead of a vehicle or transmission output shaft, without a restriction 12, rotation of the pump would produce relatively little pressure in the entire system since substantially all the fluid would vent out through bores 26. The restriction 12 therefore isolates the governor assembly from the rest of the control system and provides initially a controlled flow to the governor. The orifice is of a small enough area that leakage loss is low, even with the governor at a standstill, due to, among other factors, the viscosity of the fluid. The flow, however, is sufficient at low speeds of rotation to provide the desired fast rate of change of the governor output pressure rise.

At higher governor body speeds, however, when the pump is rotating at high speeds, and the fluid has thinned, thereby increasing the leakage losses, the small flow through orifice 12 is not sufficient to satisfy governor requirements, i.e., maintain valve 22 regulating. In other words, since the fluid is thinner, it escapes more easily out of the system, thereby decreasing the already small volume of fluid on the downstream side of the orifice 12. As a result, the valve member 22 might end its regulating action at a speed much lower than that desired, since the flow is insufficient to effect a pressure buildup adequate to overcome the rapidly increasing centrifugal force acting on the valve. The introduction of the second orifice within the system at higher governor speeds provides the necessary increased flow for regulation.

Turning now to the details of construction, the fluid pump 10 is shown as being of the gear type, although other suitable types having outputs varying as a function of the speed of rotation of a shaft could be used without departing from the scope of the invention. The pump can be driven by any suitable means (not shown), although it is preferably driven by the output shaft of a motor vehicle transmission so as to provide a changing pressure more closely indicative of changes in vehicle speed.

The pump has an intake conduit 40 connected to a sump 42, and discharges fluid under pressure into a main supply line 44 past a combination check and pressure regulator valve 46. This valve prevents overload of the pump and regulates the pressure to a desired operating level. It has a relief line 48 connected to the sump 42.

The first orifice or flow restricting means 12 is located in the main supply line 44, and is of a predetermined diameter. It meters fluid both to the governor main inlet line 14 and the output signal pressure line 30.

The governor includes the body 18 projecting radially from opposite sides of a rotating shaft 50. It has a number of radial bores 52 branched from inlet line 14 and connected by bisecting bores 54 and 56 opening into a main fluid pressure chamber or bore 58. As best seen in FIGURE 2, bores 56 further intersect vent bores 26 and 28. Chamber 58 also has an outlet port 60 at its axis to permit the escape of fluid therein to the sump.

The chamber contains ball valves 20 and 22, which are radially movable under the effects of centrifugal force to the outer peripheral portions of chamber 58 to block the exhaust of fluid through bores 26 and 28. Valve 20 is freely movable in the chamber, while valve 22 is held in a position blocking flow into line 28 by spring 32 seated against the ball and a valve seat 62 provided in the chamber. The portions 64 of the chamber adjacent the exhaust bores 26 and 28 are suitably curved or arcuately faired as shown so as to not restrict the discharge of fluid past the ball members once they become unseated.

The ball valves operate in the following manner. Initially, spring 32 seats ball valve 22 to block bore 28 and prevent regulating action by this valve at this time. Upon initial rotation of the pump 10, shaft 50, and governor body 18, centrifugal force acting on ball valve 20 will position it radially outwardly as shown blocking off the communication of fluid from line 14 to the exhaust bores 26, the orifice 12 providing an initial delay in the build-up in pressure in the lines. Once the lines have been filled with fluid, a pressure buildup occurs, resulting in fluid pressure forces acting against the portion of the ball valves covering bores 56.

For any given pressure level, when the fluid pressure acting on the ball valve exceeds the centrifugal force acting on the valve in the opposite direction, the valve will move radially inwardly to leak just enough fluid through ports 26 to drop the pressure in line 52 to a point where the centrifugal force on the valve will again seat it. Continued faster rotation of the governor body again causes an increase in the fluid pressure in an attempt to overcome the increased centrifugal force to again unseat the valve. The valve therefore regulates back and forth, opening and closing with changes in the speed of rotation and the resultant changes in the centrifugal and fluid pressure forces acting on the valve. A progressively increasing fluid output signal pressure is therefore provided in governor output pressure line 30, the pressure varying as a function of the change in speed of rotation of shaft 50 as indicated by line 70 in FIGURE 4.

The mass of ball valve 20 is chosen so that at a predetermined point, as indicated in FIGURE 4 at 72, the centrifugal forces acting against the valve are now sufficient to maintain it in a closed nonregulating position. The valve therefore blocks the exhaust of fluid through ports 26 regardless of the pressure increase in lines 52 due to further increases in the speed of rotation. The mass of ball valve 22 and the force of spring 32, however, are also chosen so that at the particular moment ball valve 20 assumes its nonregulating position, ball valve 22 will begin regulating. That is, this pressure level acting on the larger area of ball valve 22 is now sufficient to overcome the combined forces of spring 32 and the centrifugal force acting on the ball valve, to permit valve 22 to begin regulating the pressure in line 52 and line 30.

Ball valve 22 regulates in the same manner as ball valve 20, changing the pressure in line 30 as a function of the change in speed of rotation of the governor body and pump. As described previously, however, higher speeds of operation require a greater flow rate to the governor valve 22. That is, more fluid flow is required than is permitted by orifice 12 to balance the rapidly increasing centrifugal force and maintain the regulating action.

Accordingly, the main conduit 44 is provided with a bypass 74 containing the second orifice 36 of fixed area. The bypass is interrupted by a valve chamber 76 having a valve 78 slidably mounted thereon. The valve is of the spool type having large and small diameter lands 80 and 82 interconnected by a neck portion 84 of reduced diameter. The valve bore intersects the main conduit 44 downstream of orifice 12 so as to be sensitive to the pressure changes in this portion. The valve is biased by a spring 84 to a position blocking communication between line 74 and chamber 76, and moves to an open position at a predetermined pressure in conduit 44 to permit passage of fluid through orifice 36.

The point at which the valve 78 moves is at the breakpoint between the governor regulating stages. That is, the fluid pressure level sufficient to begin regulating action of valve 22, is also sufficient, acting against the face 85 of valve land 80, to overcome the force of spring 84 and move valve 78 to connect lines 74 and chamber 76. Thereafter, upon continued increase in the speed of rotation of pump 10, shaft 50, and governor body 18, the main flow of fluid in line 44 flows simultaneously through both orifices 12 and 36, thereby providing an increase in the flow rate and satisfying the governor requirements. The ball valve 22 therefore regulates the exhaust of fluid through the discharge ports 28 to control the rate of flow across both orifices and provide a slow rate of change of the output signal pressure in line 30 with changes in the speed of rotation. This change is reflected in FIGURE 4 by line 90.

The governor operates in a similar manner upon decreasing speeds. That is, at the time the centrifugal force plus spring force on valve 22 overcomes the opposing fluid pressure and causes the valve to cease to regulate, valve 78 closes, and valve 20 begins regulating. Thus, only one valve is regulating at any one time. FIGURE 3 illustrates a modification of the governor assembly shown in FIGURES 1, 2 and 4. This modification differs from the previous construction only with respect to the shape or configuration of the valve members 20 and 22. In this instance, they are shown as being of the cylindrical or spool type 20', 22', with conical end faces 100, 102 cooperating with conical seats 104, 106 for controlling the flow through the discharge ports, not shown. This modification, in all other respects, is constructed and operates in the same manner as the FIGURES 1, 2 and 4 constructions, and the details will therefore not be repeated.

From the foregoing, it will be seen that the invention provides a two-stage fluid pressure centrifugal governor assembly providing, initially, a fast rate of change of the output pressure rise, followed by a slow rate of change in the pressure at higher speeds. It will also be seen that the governor provides two pressure stages operating independent of each other, and that the rate of control of the flow from the pump is properly proportioned during each stage by the provision of variable flow restricting apparatus which is sensitive to the change in the pressure level of the fluid in the governor output pressure signal line.

It will further be seen that the pressure regulating stages of the governor are operated successively, and each only when the operation of the other is terminated. Finally, it will be seen that the invention, while simple in construction, provides efficient operation at all times because of the low leakage therefrom, due in part to the particular construction of the valve members and their cooperating seats providing positive sealing arrangements.

While the invention has been illustrated in its preferred embodiments, it will be clear to those skilled in the arts to which the invention pertains that many changes and modifications may be made thereto without departing from the scope of the invention.

We claim:

1. A multi-stage fluid pressure governor assembly comprising, in combination, a rotating shaft having conduit means therein containing a fluid under a varying pressure, speed responsive fluid regulating control means for regulating the pressure of the fluid in a plurality of successive independent stages, flow control means in said conduit means restricting the supply of fluid to said control means, and other means upstream of said pressure control means movable in response to a predetermined pressure of the fluid therein to supply additional fluid to said pressure control means.

2. A multi-stage fluid pressure governor assembly comprising, in combination, a rotating shaft having conduit means therein containing a fluid under a varying pressure, said conduit means having flow restricting means controlling the supply of fluid downstream thereof, speed responsive fluid regulating control means in said conduit means downstream of said flow restricting means for regulating the pressure of the fluid in a plurality of successive independent stages, and other means upstream of said pressure control means for increasing the supply of fluid to said pressure control means.

3. An assembly as in claim 2, said other means including a branch conduit connected to said conduit means bypassing said flow restricting means, and flow control means movable into and out of said branch conduit to control a supplemental supply of fluid to said control means.

4. An assembly as in claim 3, said flow control means being acted upon and moved between positions opening and closing said branch conduit by the fluid under pressure in said conduit means downstream of said flow restricting means.

5. An assembly as in claim 3, said flow control means being acted upon and progressively moved between positions opening and closing said branch conduit by the fluid under pressure in said conduit means downstream of said flow restricting means.

6. An assembly as in claim 5, said flow control means comprising a pressure sensitive valve extending into said conduit means to be acted thereupon and moved by the fluid therein to a position opening said branch conduit, and spring means biasing said valve to a position blocking said branch conduit.

7. An assembly as in claim 6, including means preventing the operation of said control means in one stage until the said control means has completed operation in another stage, said flow controlling means being movable concurrent with the changeover from one stage of operation of the control means to another.

8. A multi-stage fluid pressure governor assembly comprising, in combination, a rotating shaft having conduit means therein containing a fluid under a varying pressure, said conduit means having flow restricting means controlling the supply of fluid downstream thereof, speed responsive fluid regulating control means downstream of said flow restricting means for regulating the pressure of the fluid in a plurality of successive independent stages, and other means upstream of said pressure control means responsive to the regulated pressure of the fluid for increasing the supply of fluid to said pressure control means.

9. A multi-stage fluid pressure governor assembly comprising, in combination, a governor body rotatable about an axis and having conduit branched means therein containing fluid under a varying pressure, said conduit means having flow restricting means controlling the supply of fluid downstream thereof, speed responsive fluid regulating control means downstream of said flow restricting means for regulating the pressure of the fluid in a plurality of successive stages, said speed responsive means including first and second fluid pressure regulating valve members mounted on opposite portions of the axis of said body and each independently movable radially under the effect of centrifugal force to regulate the exhaust of fluid from a separate branch of said conduit means as a function of the speed of rotation of said body and pressure in said conduit, means delaying the regulating operation of one of said valve members, and other means upstream of said pressure control means for increasing the supply of fluid to said control means.

10. A multi-stage fluid pressure governor assembly comprising, in combination, a governor body rotatable about an axis and having conduit branched means therein containing fluid under a varying pressure, said conduit means having flow restricting means controlling the supply of fluid downstream thereof, speed responsive fluid regulating control means downstream of said flow restricting means for regulating the pressure of the fluid in a plurality of successive independent stages, said speed responsive means including first and second fluid pressure regulating valve members mounted on opposite portions of the axis of said body and each independently movable radially under the effect of centrifugal force to regulate the exhaust of fluid from a separate branch of said conduit means as a function of the speed of rotation of said body and pressure in said conduit, means delaying the regulating operation of one of said valve members until the other of said valve members has completed its regulating operation, and other means upstream of said pressure control means for supplying fluid to said control means in addition to the fluid supplied thereto through said flow restricting means.

11. A multi-stage fluid pressure governor assembly comprising, in combination, a governor body rotatable about an axis and having branched conduit means therein containing fluid under a varying pressure, said conduit means having flow restricting means controlling the supply of fluid downstream thereof, speed responsive fluid regulating control means downstream of said flow restricting means for regulating the pressure of the fluid in a plurality of successive stages, said speed responsive means including first and second fluid pressure regulating valve members mounted on opposite portions of the axis of said body and each independently movable radially under the effect of centrifugal force to regulate the exhaust of fluid from a separate branch of said conduit means as a function of the speed of rotation of said body and pressure in said conduit, means delaying the regulating operation of one of said valve members, and other means upstream of said pressure control means responsive to and movable by the fluid pressure therein at higher speeds of rotation of said body for decreasing the degree of restriction of the fluid supply to said control means.

12. A multi-stage fluid pressure governor assembly comprising, in combination, a governor body rotatable about an axis and having branched conduit means therein containing fluid under a varying pressure, said conduit means having a first flow restricting orifice therein, speed responsive control means downstream of said orifice for regulating the pressure of the fluid in a plurality of successive stages, said speed responsive means including first and second fluid pressure regulating valve members mounted on opposite portions of the axis of said body and each independently movable radially under the effect of centrifugal force to regulate the exhaust of fluid from a separate branch of said conduit means as a function of the speed of rotation of said body and pressure in said conduit, spring means biasing one of said valve members to a branch closing position to delay the regulating operation of said one of said valve members, a second orifice in a branch conduit in parallel with said first orifice, and other means in said orificed branch conduit responsive to the fluid pressure at higher speeds of rotation of said body for opening the orificed branch conduit to permit flow through both of said orifices to said valve members.

13. A multi-stage fluid pressure governor assembly comprising, in combination, a governor body rotatable about an axis and having branched conduit means therein containing fluid under a varying pressure, said conduit means having a first flow restricting orifice therein, speed responsive control means downstream of said orifice for regulating the pressure of the fluid in a plurality of successive stages, said speed responsive means including first and second fluid pressure regulating valve members mounted on opposite portions of the axis of said body and each independently movable radially under the effect of centrifugal force to regulate the exhaust of fluid from a separate branch of said conduit means as a function of the speed of rotation of said body and pressure in said conduit, spring means biasing one of said valve members to a branch closing position to delay the regulating operation of said one of said valve members, a second orifice in a branch conduit in parallel with said first orifice, and other means in said orificed branch conduit responsive to the fluid pressure at higher speeds of rotation of said body for opening the orificed branch conduit to permit flow through both of said orifices to said valve members, said other means comprising a valve biased to a position closing said orificed branch conduit and movable in response to a predetermined fluid pressure in said conduit downstream of said first orifice to a position opening said orifice branched conduit.

14. A multi-stage fluid pressure governor assembly comprising, in combination, a governor body rotatable about an axis and having branched conduit means therein containing fluid under a varying pressure, said conduit means having a first flow restricting orifice therein limiting the flow rate therethrough, speed responsive control means downstream of said orifice for regulating the pressure of the fluid in a plurality of successive stages, said speed responsive means including first and second fluid pressure regulating valve members mounted on opposite portions of the axis of said body and each independently movable radially under the effect of centrifugal force to regulate the exhaust of fluid from a separate branch of said conduit means as a function of the speed of rotation of said body and pressure in said conduit, spring means biasing one of said valve members to a branch closing position to delay the regulating operation of said one of said valve members, a second orifice in a branch conduit in parallel with said first orifice, and other means in said orificed branch conduit responsive to the fluid pressure at higher speeds of rotation of said body for opening the orificed branch conduit to permit flow through both of said orifices to said valve members, said other means comprising a valve biased to a position closing said orificed branch conduit and movable in response to a predetermined fluid pressure in said conduit downstream of said first orifice to a position opening said orifice branched conduit, one of said regulating valve members consisting of a ball.

15. A multi-stage fluid pressure regulating mechanism comprising, in combination, a rotatable source of fluid varying in pressure, a conduit having an inlet portion connected to said source and an exhaust opening and branch signal line therebetween, a speed sensitive fluid pressure regulating device in said conduit means operable in a multiple of stages to regulate the flow of fluid out said exhaust opening and the pressure build-up in said branch line in a plurality of independent stages as a function of the speed of rotation of said device, a first flow controlling means in said conduit between said source and device restricting the supply of fluid to said device, and second flow controlling means in said conduit between said source and device acted upon by and movable about a predetermined pressure of the fluid supplied to said device to increase the supply of fluid to said device.

16. A mechanism as in claim 15, including means preventing the operation of said device in one stage until the said device has completed operation in another stage, said second flow controlling means being movable concurrent with the changeover from one stage of operation of the device to another.

17. A mechanism as in claim 15, said second flow controlling means comprising a pressure sensitive valve in said conduit downstream of said first means movable by the pressure of the fluid therein from a position blocking flow through a second conduit bypassing said first means to a position permitting flow through said second conduit.

18. A mechanism as in claim 17, said valve being progressively movable by the fluid pressure in said conduit to progressively increase the supply of fluid to said valve members supplemental to the fluid supplied thereto through said first means.

19. A mechanism as in claim 15, including means preventing the operation of said device in one stage until the said device has completed operation in another stage, said second flow controlling means being movable concurrent with the changeover from one stage of operation of the device to another, said second flow controlling means comprising a pressure sensitive valve in said conduit downstream of said first means movable by the pressure of the fluid therein from a position blocking flow through a second conduit bypassing said first means to a position permitting flow through said second conduit, said valve being progressively movable by the fluid pressure in said conduit to progressively increase the supply of fluid to said valve members supplemental to the fluid supplied thereto through said first means.

References Cited by the Examiner

UNITED STATES PATENTS

| | | | |
|---|---|---|---|
| 1,285,998 | 11/1918 | Hick. | |
| 1,329,385 | 2/1920 | Egger | 137—56 X |
| 1,347,208 | 7/1920 | Cockburn | 137—56 |
| 2,377,350 | 6/1945 | Marsh | 137—56 X |
| 2,711,749 | 6/1955 | Hettinger | 137—56 |
| 2,741,256 | 4/1956 | Barton | 137—56 |
| 2,889,844 | 6/1959 | McFarland | 137—56 X |
| 3,086,541 | 4/1963 | De Corte | 137—56 |
| 3,133,552 | 5/1964 | Newburgh | 137—56 X |

WILLIAM F. O'DEA, *Primary Examiner.*

CLARENCE R. GORDON, *Examiner.*